United States Patent
Plotsker

(12) 
(10) Patent No.: US 6,469,828 B2
(45) Date of Patent: Oct. 22, 2002

(54) PANORAMIC NIGHT VISION GOGGLE HAVING MULTI-CHANNEL MONOCULAR ASSEMBLIES WITH A MODIFIED EYEPIECE

(75) Inventor: Vadim Plotsker, Amherst, NH (US)

(73) Assignee: Insight Technology, Inc., Londonderry, NH (US)

( * ) Notice: Subject to any disclaimer, the term of this patent is extended or adjusted under 35 U.S.C. 154(b) by 0 days.

(21) Appl. No.: 09/784,314

(22) Filed: Feb. 16, 2001

(65) Prior Publication Data

US 2002/0114069 A1 Aug. 22, 2002

(51) Int. Cl.[7] .............................................. G02B 23/00
(52) U.S. Cl. ........................ 359/409; 359/399; 359/407
(58) Field of Search ................................. 359/362–363, 359/404–409, 411–420, 480–482, 642–643, 900, 353

(56) References Cited

U.S. PATENT DOCUMENTS

| | | | | |
|---|---|---|---|---|
| 4,323,298 A | * | 4/1982 | Brennan | 359/412 |
| 4,757,378 A | * | 7/1988 | Hackett, Jr. et al. | 358/88 |
| 5,233,458 A | * | 8/1993 | Moffitt et al. | 359/227 |
| 6,075,644 A | * | 6/2000 | Filipovich | 359/407 |

* cited by examiner

Primary Examiner—Thong Nguyen
(74) Attorney, Agent, or Firm—Mintz, Levin, Cohn, Ferris, Glovsky and Popeo, PC

(57) ABSTRACT

A panoramic night vision goggle (PNVG) system is disclosed having a modified eyepiece that enables an improved field of view for at least an inner optical channel. Embodiments of the PNVG system may have a inner optical channel and an outer optical channel, each having an eyepiece element. In some embodiments, the inner eyepiece element may have an edge portion that is generally circular in shape and the outer eyepiece element may have an edge portion that is the complementary shape of the inner element edge portion.

1 Claim, 3 Drawing Sheets

PANORAMIC NIGHT VISION GOGGLE HAVING MULTI-CHANNEL MONOCULAR ASSEMBLIES WITH A MODIFIED EYEPIECE

FIELD OF THE INVENTION

The invention relates to a panoramic night vision goggle system having at least an inner and outer optical channel per monocular subassembly and having a modified eyepiece that enables an improved field of view for at least the inner optical channel.

BACKGROUND OF THE INVENTION

Panoramic Night Vision Goggle (PNVG) systems are known. One type of PNVG comprises two monocular subassemblies, each containing two image intensifier tubes. The subassemblies are mounted on a bridge assembly. Each subassembly has an inner tube and an outer tube. In one configuration, the inner tubes each have an optical axis that is substantially coaxial with one of the user's optical axes and have a partially overlapping field of view (FOV) (e.g., each may have approximately a 40 degree FOV or any other FOV). The outer tubes each have an optical axis that is angled with respect to the user's optical axes so that peripheral vision is used to see a greater field of view.

At least some prior systems design a monocular subassembly eyepiece to have two lens elements, both of which are ground relatively flat on the sides at which they contact. For example, FIG. 1 shows an existing eyepiece configuration with anouter channel eyepiece element 100 and an inner eyepiece element 102. Elements 100 and 102 contact each other along their respective flat sides as indicated at 104. This design has various drawbacks, one of which is that it decreases the field of view for the inner eyepiece element, which is typically the element through which the major viewing activity takes place. These and other drawbacks exist.

SUMMARY OF THE INVENTION

An object of the invention is to overcome these and other drawbacks.

Another object of the present invention is to provide a PNVG system with one or monocular subassemblies each containing at least an inner optical channel and an outer optical channel that combine to form a single image and where the monocular subassembly comprises a combined eyepiece characterized by an outer eyepiece element being shaped to accommodate the profile of a substantially unmodified inner eyepiece element.

According to one embodiment, the inner eyepiece is generally circular and the outer eyepiece is generally circular except for the portion of an edge that abuts the inner eyepiece, such portion being complementary shaped with respect to the abutting portion of the inner eyepiece.

According to one embodiment of the invention, the monocular subassembly may comprise a combined eyepiece that allows the inner channel eyepiece element to remain whole. A portion of the outer eyepiece element may be cut in a circular fashion to accommodate the inner eyepiece and to allow for the perceived complete overlap of the image provided by both inner channels. Other configurations and geometries may be used. Designing the combined eyepiece in this way can improve the image resolution over the field of view.

DETAILED DESCRIPTION OF THE DRAWINGS

Figure 1:
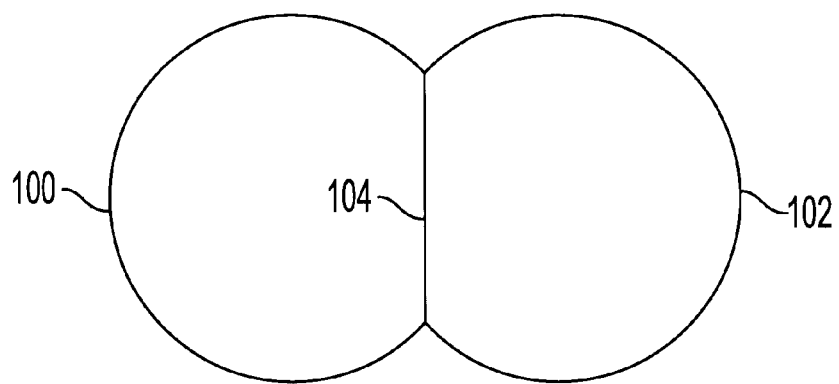
FIG. 1 is an eyepiece element according to existing PNVG systems.

FIG. 1 shows an existing PNVG eyepiece having an outer channel eyepiece element 100 and an inner channel eyepiece element 102. Each eyepiece element 100 and 102 has one edge cut substantially flat. The two flat edges are then mated as indicated at 104. One disadvantage of this type of eyepiece is that it reduces the size of the field of view for the inner channel eyepiece, which is typically the eyepiece through which a majority of viewing takes place.

Figure 2:
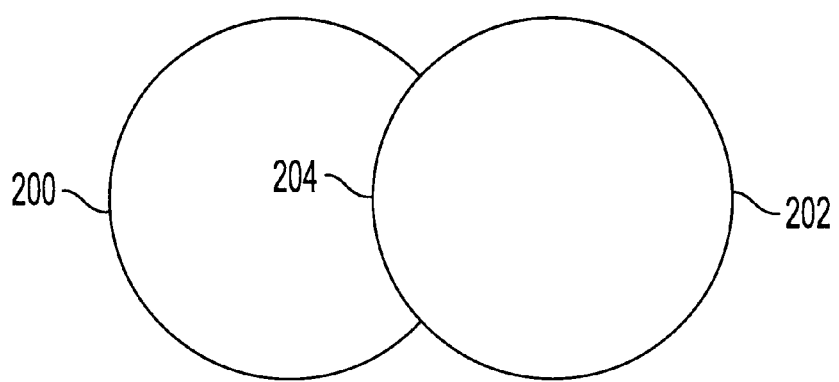
FIG. 2 is an eyepiece element according to one embodiment of the invention.

FIG. 2 shows a modified eyepiece according to one embodiment of the invention. In some embodiments, the eyepiece may be formed by an outer channel element 200 and an inner channel element 202. In some embodiments, only a portion of the edge of the outer channel element 200 is cut. Preferably, this portion corresponds to the portion that will abut an edge portion of element 202. The edge portion of the outer channel element may be cut in any shape that will enable the outer channel element 200 to satisfactorily mate with the edge of the inner channel piece. For example, an edge portion of outer channel element 200 may be cut into an arcuate or generally curved shape along the portion so that it mates with a complementarily shaped circular or generally curved portion of an edge of inner channel element 202 as indicated at 204.

Of course, other profiles of inner and outer channel elements may be used. Regardless of the particular shape of the elements, the inner channel element (e.g., 202) is left substantially unaltered at the edges, while the outer channel element (e.g., 200) is cut along at least a portion of one edge so as to mate with a portion of the edge of the inner channel element. In this manner, the field of view through the inner element is maximized.

Figure 3:
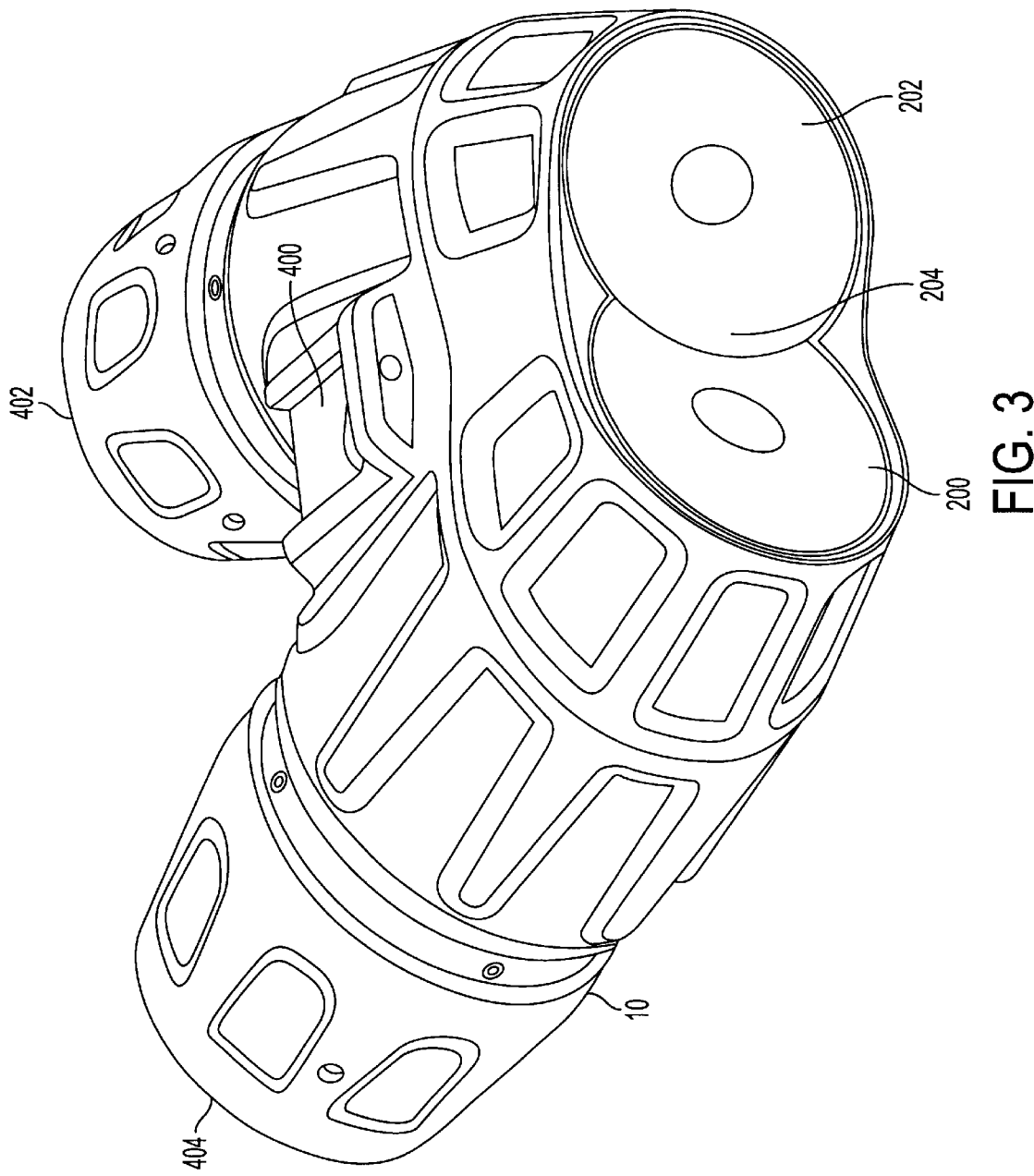
FIG. 3 is a monocular subassembly according to one embodiment of the invention.

FIG. 3 depicts the eyepiece assembly in a PNVG monocular subassembly 10. As shown, monocular subassembly 10 may comprise an inner channel 402 and an outer channel 404. Some embodiments may also comprise a mounting portion 400 that enables mounting of subassembly 10 onto a PNVG or other optical imaging system.

In some embodiments, an eyepiece assembly in accordance with the invention may be manufactured in any suitable fashion. For example, a portion of an edge of inner element 202 may be ground into a generally curved shape (e.g., circular) and a portion of an edge of outer element 200 may be ground into a complementary curved shape so that the elements mate along the ground portions at 204. The grinding of the elements (e.g., 200, 202) may be accomplished on a Computer Numerically Controlled (CNC) optical element grinding machine or other suitable machine. The elements may be aligned along their respective optical axes in the eyepiece housing and bonded in place using appropriate optical bonding adhesive. Optically transparent bonding adhesive may be applied along the mating portion (e.g., 204) of the elements to seal the inner part of the monocular from the environment.

The present invention is not to be limited in scope by the specific embodiments described herein. Various modifications of the present invention, in addition to those described herein, will be apparent to those of ordinary skill in the art from the foregoing description and accompanying drawings. Such modifications are intended to fall within the scope of the following appended claims. Although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. An eyepiece for a panoramic night vision goggle monocular assembly comprising:

an inner channel element having a completely circular perimeter including a first edge portion; and an outer channel element having a partially circular perimeter comprising a convex edge portion and a second edge portion that abuts the first edge portion, wherein the first edge portion comprises a portion of the completely circular perimeter and the second edge portion has a generally concave shape that is complementary to the first edge portion, wherein the inner channel element and the outer channel element edge mate together along the first edge portion and the second edge portion.

* * * * *